United States Patent
Hasegawa et al.

(10) Patent No.: US 7,519,993 B2
(45) Date of Patent: Apr. 14, 2009

(54) INFORMATION PROCESSING TERMINAL AND INFORMATION SECURITY AND PROTECTION METHOD THEREFOR

(75) Inventors: Susumu Hasegawa, Inagi (JP); Yoshinori Ito, Inagi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 952 days.

(21) Appl. No.: 10/893,901

(22) Filed: Jul. 20, 2004

(65) Prior Publication Data
US 2005/0222958 A1 Oct. 6, 2005

(30) Foreign Application Priority Data
Mar. 31, 2004 (JP) ............... 2004-105208

(51) Int. Cl.
*G06F 12/00* (2006.01)
*H04L 9/00* (2006.01)

(52) U.S. Cl. .......... 726/21; 713/160; 713/161; 713/164; 713/169; 713/182; 713/183; 713/184; 726/2; 726/6; 726/9; 705/16; 705/64; 705/72; 705/77; 380/255

(58) Field of Classification Search ............ 705/16; 726/2, 21
See application file for complete search history.

(56) References Cited

U.S. PATENT DOCUMENTS

| 5,615,263 | A | 3/1997 | Takahashi ............... 380/4 |
| 6,336,095 | B1* | 1/2002 | Rosen ............... 705/1 |
| 2001/0039535 | A1* | 11/2001 | Tsiounis et al. ............. 705/71 |
| 2003/0135751 | A1 | 7/2003 | O'Donnell et al. ........ 713/200 |
| 2005/0009564 | A1* | 1/2005 | Hayaashi et al. ........ 455/558 |
| 2005/0167512 | A1* | 8/2005 | Minemura et al. ........ 235/492 |

FOREIGN PATENT DOCUMENTS

| EP | 0456548 | 11/1991 |
| JP | 2003-157239 | 5/2003 |
| WO | WO 97/05551 | 2/1997 |

\* cited by examiner

*Primary Examiner*—Kambiz Zand
*Assistant Examiner*—Jenise E Jackson
(74) *Attorney, Agent, or Firm*—Staas & Halsey LLP

(57) ABSTRACT

The present invention is an information processing terminal capable of preventing leakage of identification information while adopting a general-purpose OS to provide development environment for a free application software and using a common keyboard for entry of identification number information and entry of other information. The information processing terminal is so constituted that a management mechanism comprises an execution management unit for operating a first and second information processing mechanisms, when a trigger detecting unit detects a trigger operation, so as to restrict execution of a first application and start a second application.

18 Claims, 6 Drawing Sheets

INFORMATION PROCESSING TERMINAL AND INFORMATION SECURITY AND PROTECTION METHOD THEREFOR

BACKGROUND OF THE INVENTION

1) Field of the Invention

The present invention relates to an information processing terminal and an information security and protection method therefor, and in particular to an information processing terminal and an information security and protection method therefor preferably used for settlement of registered merchandise to be purchased.

2) Description of the Related Art

In recent years, there have been developed transaction systems which perform ordering process for merchandises and settlement processing by credit card or the like using a portable terminal such as a hand-held terminal, a personal digital assistant (PDA), or the like. Attention has been focused on a transaction form using such a portable terminal because of its convenience, and it is extremely important how to secure and protect information about users particularly associated with settlement processing or the like, that is, how to ensure countermeasures of preventing the leakage of secret information about users.

Usually, when such information about a user is inputted, there is carried out authentication of the user through input of an identification number so as to prevent any fraudulent settlement processing or the like based on impersonation. It is therefore important to prevent a user's own identification number from being known by other persons, and hitherto various techniques for securing and protecting a user's own identification number have been developed.

For example, in a terminal having environment in which an application runs on a general-purpose operating system (OS), there is the possibility that a fraudulent application by impersonator, wherein an identification number is entered, may be easily created and operated, so that there is to be taken into account the potential of the leaking of the identification number through such fraudulent application by impersonator. To cope with such problem, a preventive countermeasure has been taken, by using a non-disclosed special OS which runs only when handling an identification number, to eliminate the possibility of creating and operating a fraudulent application by impersonator as described above so as to prevent any leakage of an identification number.

Furthermore, since a keyboard for entering identification numbers is ordinarily used also for another purpose, identification numbers and data for another purpose are both entered through a common keyboard driver. Thus, key codes of identification numbers converted by the common keyboard driver may leak to other applications through the OS. To cope with this problem, a preventive countermeasure has been taken to prevent any leakage of identification numbers in such a way as to separately provide another keyboard exclusively used to enter identification numbers.

From among technologies related to the present invention there is described a technology in patent literature 1 shown below. In this technology described in this patent literature 1, an identification number is inputted through a mobile telephone, and a settlement terminal makes a transmission and reception to/from a portable terminal to analyze the identification number, so that a dedicated pin pad which is paired with a settlement terminal is not required and leakage of the identification number through a reader capable of being mounted on the pin pad can be prevented accordingly.

[Patent Literature 1] Japanese Patent Laid-Open Publication No.2003-157239

However, such conventional technologies for preventing leakage of an identification number pose problems as shown hereafter.

First, in the case where there is used a non-disclosed special OS which runs only when handling an identification number, persons capable of developing application programs handling identification numbers are limited to persons understanding the non-disclosed special OS, and thus environments and human resources for developing application programs are limited.

In the case where a keyboard used only for entering identification numbers is provided separately, the scale of the device increases, and yet its convenience as a portable terminal decreases.

Also in the technology described in the above patent literature 1, an identification number entered from a mobile telephone may leak out through a fraudulent application by impersonator built in the mobile telephone itself, and therefore if a special OS is used to prevent this fraudulent application by impersonator, environments and human resources for developing application programs are limited as is the case with the above mentioned.

SUMMARY OF THE INVENTION

The present invention has been devised in view of the above problems and aims to provide an information processing terminal and an information security and protection method therefor capable of preventing leakage of identification information while adopting a general-purpose OS to provide a development environment for a free application software as well as using a common keyboard for entry of identification number information and entry of other information.

Therefore, an information processing terminal according to the present invention comprises: a first information processing mechanism capable of executing a general-purpose first application; a second information processing mechanism capable of executing a second application requiring security and protection of information; a management mechanism for managing processes in the first and second information processing mechanisms; and a protection mechanism for securing and protecting information in execution of the second application, which is constituted independently of the first and second information processing mechanisms and the management mechanism, and contains a trigger detecting unit which detects a trigger operation to start the second information processing mechanism and outputs the detection of the trigger operation to the management mechanism; wherein the management mechanism further comprises an execution management unit for effecting an operation of the first and second information processing mechanisms, when the trigger detecting unit detects the trigger operation, in such a way as to restrict execution of the first application and start the second application.

In the information processing terminal, the trigger detecting unit preferably comprises a connection detecting unit for detecting, as a trigger operation from the outside, that an external storage medium capable of storing data has been connected.

In addition, the information processing terminal may further comprise an input/output interface for performing, in processing in the first and second applications, interface processing between an input/output device for performing input/output of data and the first and second information processing mechanisms, wherein the execution management unit comprises an operation mode switching unit for switching the operation mode from an operation mode of linking the input/output interface to the first information processing mechanism through the management mechanism to an operation mode of linking the input/output interface directly to the second information processing mechanism, when detecting the trigger operation.

Preferably in the information processing terminal, the second information processing mechanism comprises a second application-oriented storage unit for storing program data for the second application and identification information created from the program data; the protection mechanism comprises a key information storage unit for storing key information, and a first collation information creating unit to which identification information stored in the second application-oriented storage unit is inputted from the management mechanism, and which is able to create first collation information by using the inputted identification information, and key information stored in the key information storage unit; the management mechanism comprises a readout unit for reading out, when the trigger detecting unit detects the trigger operation, the program data and the identification information from the second application-oriented storage unit, a separation unit for performing separation between the program data and identification information read out by the readout unit, a second collation information creating unit capable of creating second collation information from the program data separated by the separation unit, and a determination unit for determining whether program data for the second application can be authenticated or not by comparing first and second collation information created by the first and second collation information creating units respectively; and the execution management unit of the management mechanism is constituted in such a way as to allow the second information processing mechanism to execute the second application after it is determined by the determination unit that the program data can be authenticated.

In this case, the protection mechanism may further comprise an unauthorized access detecting unit for detecting unauthorized access to the protection mechanism, and a key information erasing unit for erasing key information stored in the key information storage unit when the unauthorized access is detected by the unauthorized access detecting unit.

Furthermore, in the above information processing terminal, the protection mechanism may further comprise a key entry unit and a protection driver for outputting, when the trigger detecting unit detects the trigger operation, an input entered by the key entry unit for the second application, to the second information processing mechanism in such a manner that it can be identified only by the second information processing mechanism.

Furthermore, the information processing terminal may be configured in such a manner as to execute processing of registration pertaining to a merchandise to be purchased as the first application, as well as processing of settlement of account about the registered merchandise to be purchased as the second application, and the first and second information processing mechanisms and management mechanism may be constituted by a shared computer, wherein the protection mechanism is built in a single housing together with the shared computer.

Furthermore, an information security and protection method of an information processing terminal according to the present invention is an information security and protection method of an information processing terminal comprising a first information processing mechanism capable of executing a general-purpose first application, a second information processing mechanism which is started by a trigger operation from the outside and is able to execute a second application while securing and protecting information, a management mechanism for managing processes in the first and second information processing mechanisms, and a protection mechanism for securing and protecting information in the second application, which is constituted independently of the first and second information processing mechanisms and the management mechanism, wherein the information security and protection method of the information processing terminal comprises the steps of: notifying in the protection mechanism, when detecting the trigger operation from the outside, the management mechanism of the detection or detection state of the trigger operation; reading out, when receiving notice of the detection of the trigger operation, program data for the second application and identification information created from the program data from the second information processing mechanism; authenticating, in the management mechanism and protection mechanism, in cooperation with each other, the program data read out in the step of reading out by using the identification information read out together with the program data; and allowing an execution in the management mechanism, by using the program data authenticated in the step of authenticating, the second information processing mechanism to execute the second application.

In this method, the step of authenticating may comprises: creating second collation information, in the management mechanism, from the program data read out in the step of reading out, outputting, in the management mechanism, identification information read out in the step of reading out to the protection mechanism; creating first collation information, in the protection mechanism, by using the identification information outputted in the step of outputting and key information stored in the protection mechanism; and determining, in the management mechanism, on occurrence of authentication success if the first collation information matches the second collation information, while on occurrence of authentication failure, if the first collation information does not match the second collations information, with comparing the first and second collation information created in steps of creating first and second collation information, respectively.

According to the present invention, the protection mechanism and the management mechanism allow the operation itself of the second information processing mechanism to be performed under the control of a general-purpose OS, while ensuring, for preservation of confidentiality, that input/output of necessary information leads to no leakage of information to other applications, so that there is achieved an advantage that any leakage of identification information can be prevented while adopting a general-purpose OS to provide development environment for a free application software as well as using a common keyboard for entry of identification number information and entry of other information.

DESCRIPTION OF THE PREFERRED EMBODIMENTS

Embodiments of the present invention are described below with reference to the drawings.

[A] Description of an Embodiment of the Present Invention

Figure 1:
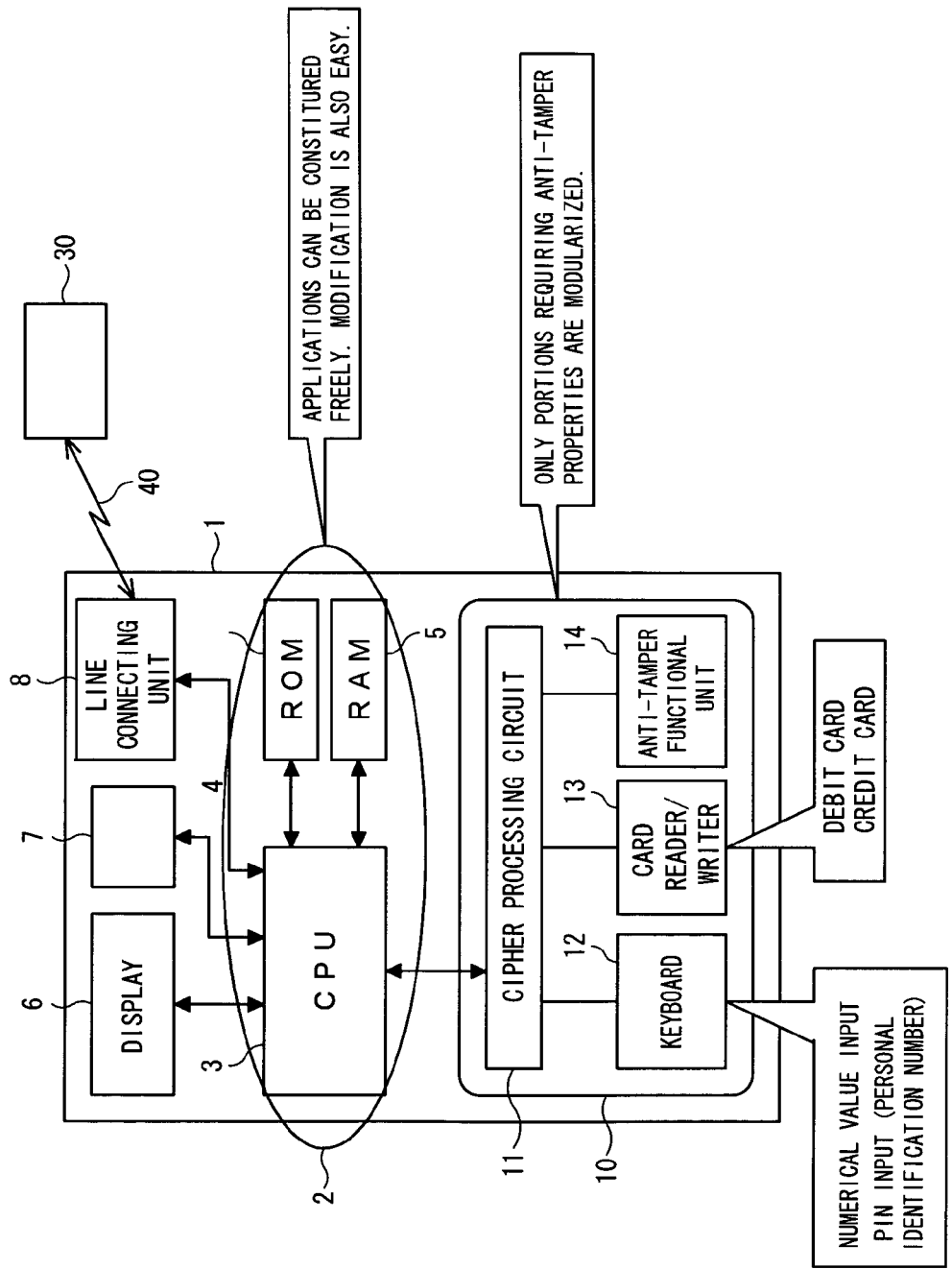
FIG. 1 is a block diagram showing an information processing terminal according to an embodiment of the present invention together with a center connected with it through a line.

FIG. 1 is a block diagram showing an information processing terminal 1 according to an embodiment of the present invention and a center 30 connected with it through a line 40. The information processing terminal 1 shown in FIG. 1 is, for example, a portable information processing terminal such as a PDA, and comprises a computer 2, a display 6, a touch panel 7 and a line connecting unit 8 which are built in a single housing together with a protection mechanism 10 constituting a characteristic feature of the present invention.

In this configuration, the computer 2 comprises a central processing unit (CPU) 3, a read only memory (ROM) 4, a random access memory (RAM) 5, and firmware such as drivers, in which programs stored in the ROM 4 are deployed in the RAM 5 and executed by the CPU 3 so that various applications can be executed.

Specifically, execution of a point of sales (POS) application enables the performing of a POS operation for registration and price computation processing (processing of obtaining a subtotal) about merchandise to be purchased by a customer or an operator itself of the terminal 1, and executing a settlement application enables the performing of settlement using a credit card, a debit card, or the like about merchandise registered by the POS application.

Furthermore, the display 6 is used to perform display processing associated with various applications in the computer 2, the touch panel 7 is used to perform entry operations by touching an indication on the screen of the display 6, and the line connecting unit 8 is used for connection with a network 40.

In particular, when the aforementioned POS operation is performed on the information processing terminal 1, it is also possible that stock information, etc, about merchandise to be purchased are obtained from the center 30 by conducting a communication with the center 30 through the network 40 by the line connecting unit 8.

Furthermore, the protection mechanism 10 is used for the security and protection of information required for applications. For example, the aforementioned settlement application is an application in which information to be kept secret such as personal information for settlement is handled, wherein there is required a particularly high level of security and protection for information to be handled. The protection mechanism 10 in this embodiment makes it possible to ensure the protection and security of information handled in the settlement application.

Figure 3:
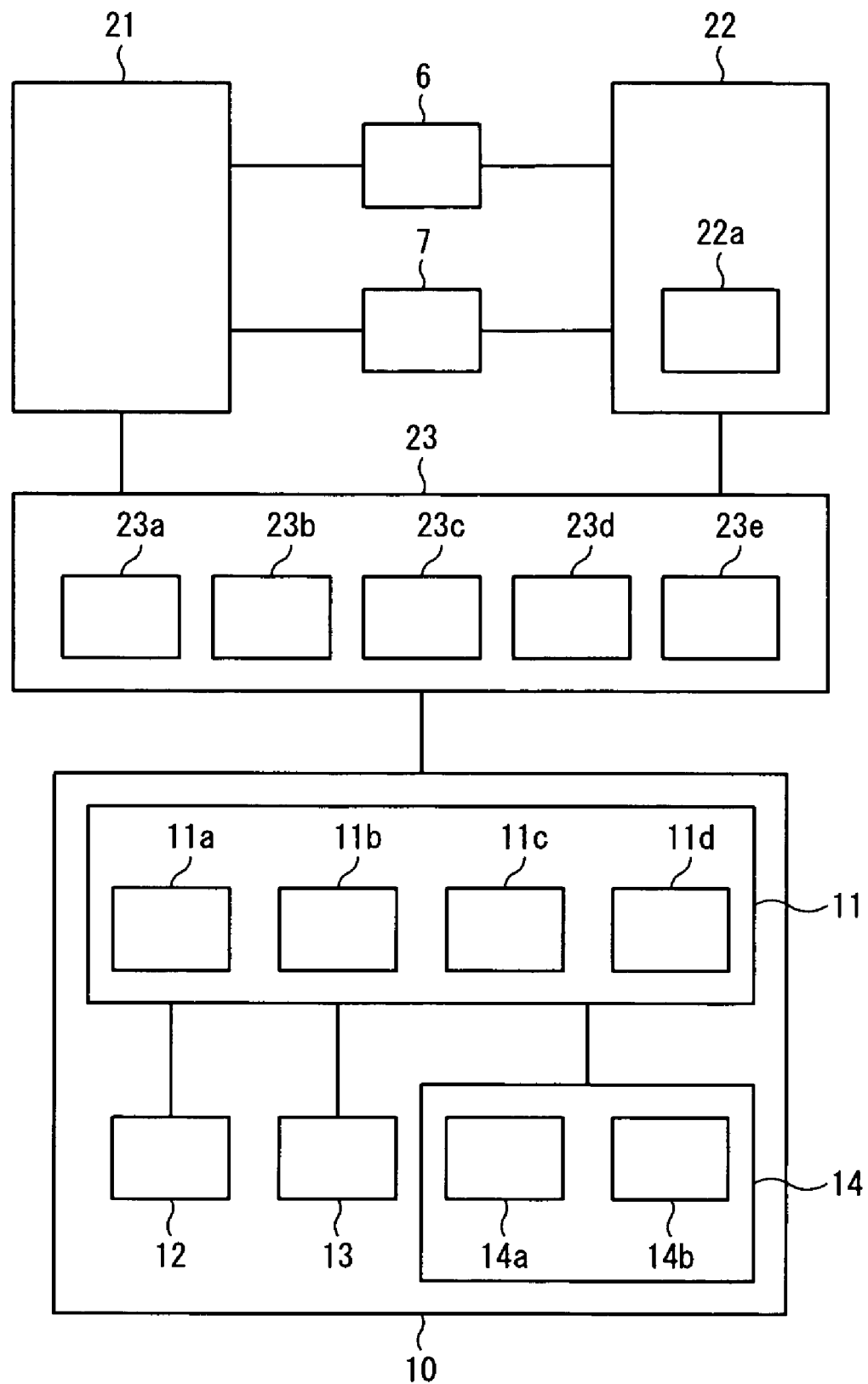
FIG. 3 is a block diagram showing an information processing terminal according to this embodiment while focusing attention on functions associated with execution of a settlement application.

This protection circuit 10 comprises a cipher processing circuit 11, a keyboard 12, a card reader/writer 13, and an anti-tamper functional unit 14. The cipher processing circuit 11 performs cipher processing for ensuring the security of information before starting and during execution of a second application, and comprises, as shown in FIG. 3, a card insertion/removal management unit 11a and a protection driver 11d as well as a key information storage unit 11b and a first collation information creating unit 11c which are constituted in such a manner as to operate when the settlement application is started.

The keyboard 12 is constituted as a key entry unit in the information processing terminal 1, and performs necessary entry operations including entry of a PIN (personal identification number) or simply identification number when the POS application or the settlement application is executed. Key entry information entered by this keyboard 12 is passed to the computer 2 through the protection driver 11d. As described later, the cipher processing circuit 11 is so constituted that the operation modes of the protection driver 11d are switched so that key entry information does not leak to other applications during execution of the settlement application.

The card reader/writer 13 is used, in order to perform settlement using an external storage medium such as an IC card, for example, in the settlement application, to read out contents stored in an IC card and write information into an IC card and is able to detect, as a connection detecting unit, that an external storage medium has been connected, specifically that an IC card has been inserted into the card insertion slot.

Insertion/removal of an IC card into/from the card insertion slot is managed by the card insertion/removal management unit 11a of the cipher processing circuit 11, and the computer 2 is able to recognize the state of insertion/removal of the IC card through the card insertion/removal management unit 11a.

Furthermore, the anti-tamper functional unit 14 is used to prevent leakage of secret information such as contents stored in the key information storage unit 11b, caused by unauthorized access made by breaking the housing open or the like, and comprises, as shown in FIG. 3, an unauthorized access detecting unit 14a for detecting the unauthorized access, and an erasing unit 14b for erasing key information stored in the key information storage unit 11b and other information to be kept secret in order that they are not taken out by the unauthorized access.

Figure 2:
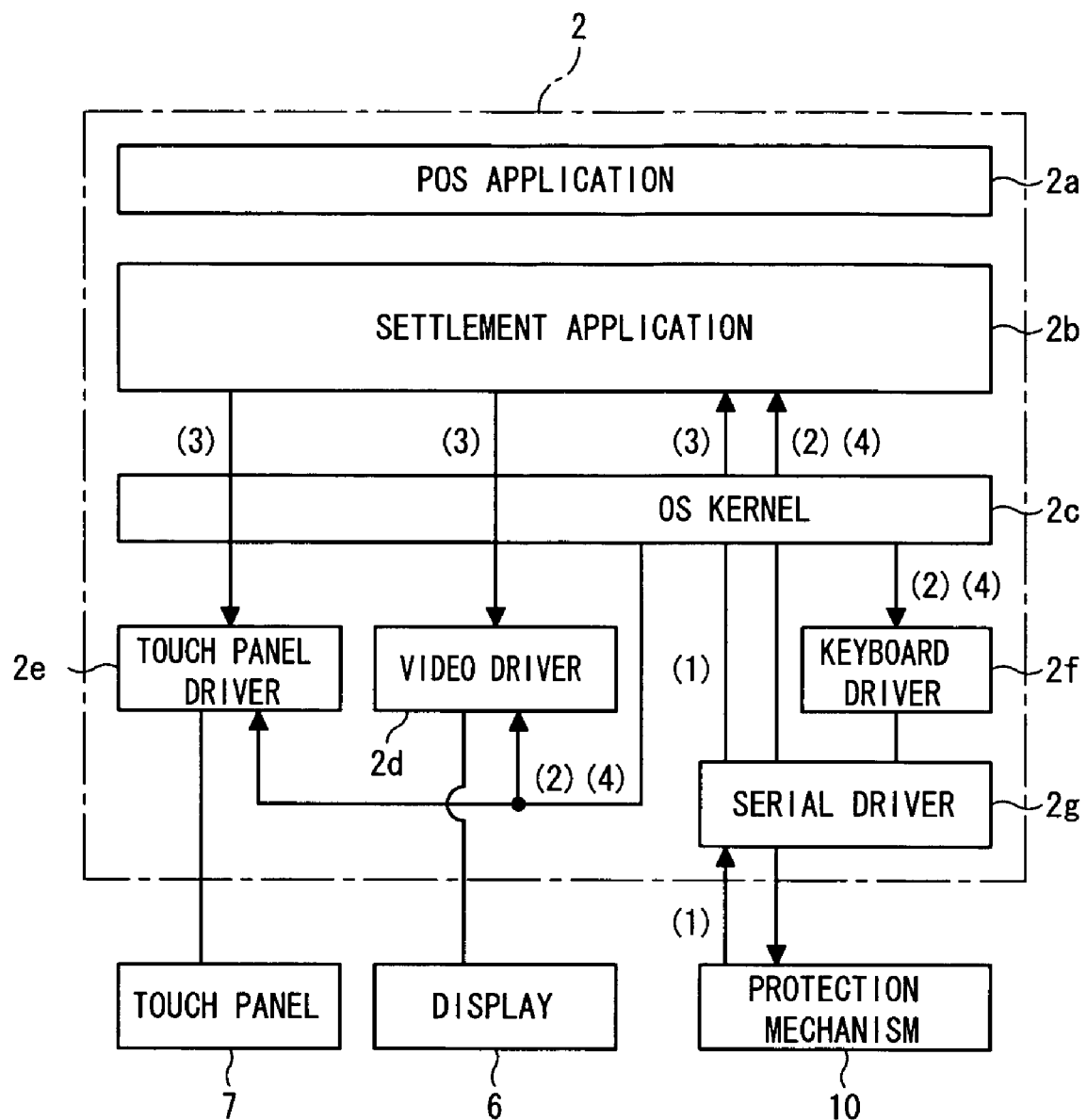
FIG. 2 is a block diagram showing the main part of an information processing terminal according to an embodiment of the present invention.

FIG. 2 is a block diagram showing the computer 2 while focusing attention on its firmware and software configurations. As shown in FIG. 2, the computer 2 is able to execute a POS application 2a and a settlement application 2b on the basis of a general-purpose OS.

In this figure, notation 2d denotes a video driver for display control for the display 6, notation 2e denotes a touch panel driver for control of input/output by the touch panel 17, notation 2f denotes a keyboard driver for input by the keyboard 12, notation 2g denotes a serial driver for performing interface processing between the protection mechanism 10 and the computer 2, and notation 2c denotes the kernel of a general-purpose OS (simply referred as OS kernel hereinafter) for overall control of the two applications 2a and 2b and the drivers 2d to 2f described above.

The drivers 2d to 2f function as input/output interfaces for performing interface processing between the display 6, touch panel 7 and keyboard 12 which are input/output devices for performing input/output of data in processing by the POS application 2a and settlement application 2b, and the first and second information processing mechanisms 21 and 22.

In addition, the operation modes of execution of the drivers 2d to 2f can be switched over for every application on the basis of instructions from the OS kernel 2c. That is, when the POS application 2a as described above is executed, the drivers 2d to 2f go into the ordinary operation modes in which they link with the POS application 2a through the OS kernel 2c, and when the settlement application 2b is executed, the drivers 2d to 2f go into the protective operation modes in which only the settlement application 2b is able to link with the drivers 2d to 2f.

By the way, when the POS application 2a or the settlement application 2b is executed, the operating states of the computer 2 are switched so that leakage of information can be prevented. FIG. 3 is a block diagram showing the information processing terminal 1 according to this embodiment while focusing attention on functions associated with execution of the settlement application 2b as described above.

As shown in FIG. 3, the computer 2 constitutes a first information processing mechanism 21 capable of performing processing of the POS application 2a (first application) which is a general-purpose application, a second information processing mechanism 22 capable of performing processing of the settlement application 2b (second application), and a management mechanism 23 for managing processing in the first and second information processing mechanisms 21 and 22.

That is, the first and second processing mechanisms 21 and 22 and the management mechanism 23 are realized by sharing hardware resources as the computer 2 shown in FIG. 1, and the protection mechanism 10 is connected with the computer 2 via the serial driver 2g to be constituted as a separate module without sharing hardware resources of the computer 2.

Specifically, the first information processing mechanism 21 is realized by execution of the POS application 2a by the computer 2 as well as the operations of the drivers 2d to 2f in the ordinary operation modes, the second information processing mechanism 22 is realized by execution of the settlement application by the computer 2 as well as the operations of the drivers 2d to 2f in the protective operation modes, and the management mechanism 23 is realized mainly by the operations of the OS kernel 2c and serial driver 2g.

The second information processing mechanism 22 has a settlement (second) application-oriented storage unit 22a, which is used to store program data for processing of the settlement application 2b and electronic signature information, which is identification information created from the program data. The settlement application-oriented storage unit 22a is composed of the ROM 4 shown in FIG. 1.

The electronic signature information is used to authenticate the validity of the program of the settlement application 2b (whether the program was installed properly at a manufacturing stage for the terminal 1) by the management mechanism 23 described later, and is created (for example, in a clean room) at a manufacturing stage for the information processing terminal 1, and stored in the ROM 4 (see FIG. 1) of the computer 2 together with the settlement application 2b.

That is, a hash A (D2) is created from the program data (D1) of the settlement application 2b by predetermined algorithm, and encrypted using an encryption key (D3) by triple-data encryption standard (3-DES) algorithm. The obtained cryptogram is assumed to be information (D4) about an electronic signature (digital signature). The electronic signature information (D4) is added to the program data (D1) to be written in the ROM 4.

Furthermore, the management mechanism 23 shown in FIG. 3 comprises an execution management unit 23a, a readout unit 23b, a separation unit 23c, a second collation information creating unit 23d, and a determination unit 23e.

The execution management unit 23a operates the first and second information processing mechanisms 21 and 22, when the IC card reader/writer 13 detects insertion of an IC card, so as to restrict execution of the POS application 2a and start the settlement application 2b, so that it is possible to prevent leakage of entered information, etc. to applications other than the settlement application when executing the settlement application.

The readout unit 23d, identification information separation/output unit 23c, second collation information creating unit 23d, and determination unit 23e are constituted in such a manner as to operate at the start of the settlement application 2b. These components will be explained together with the following explanation of the operation of the information processing terminal 1 performed at the start of the settlement application 2b.

Figure 5:
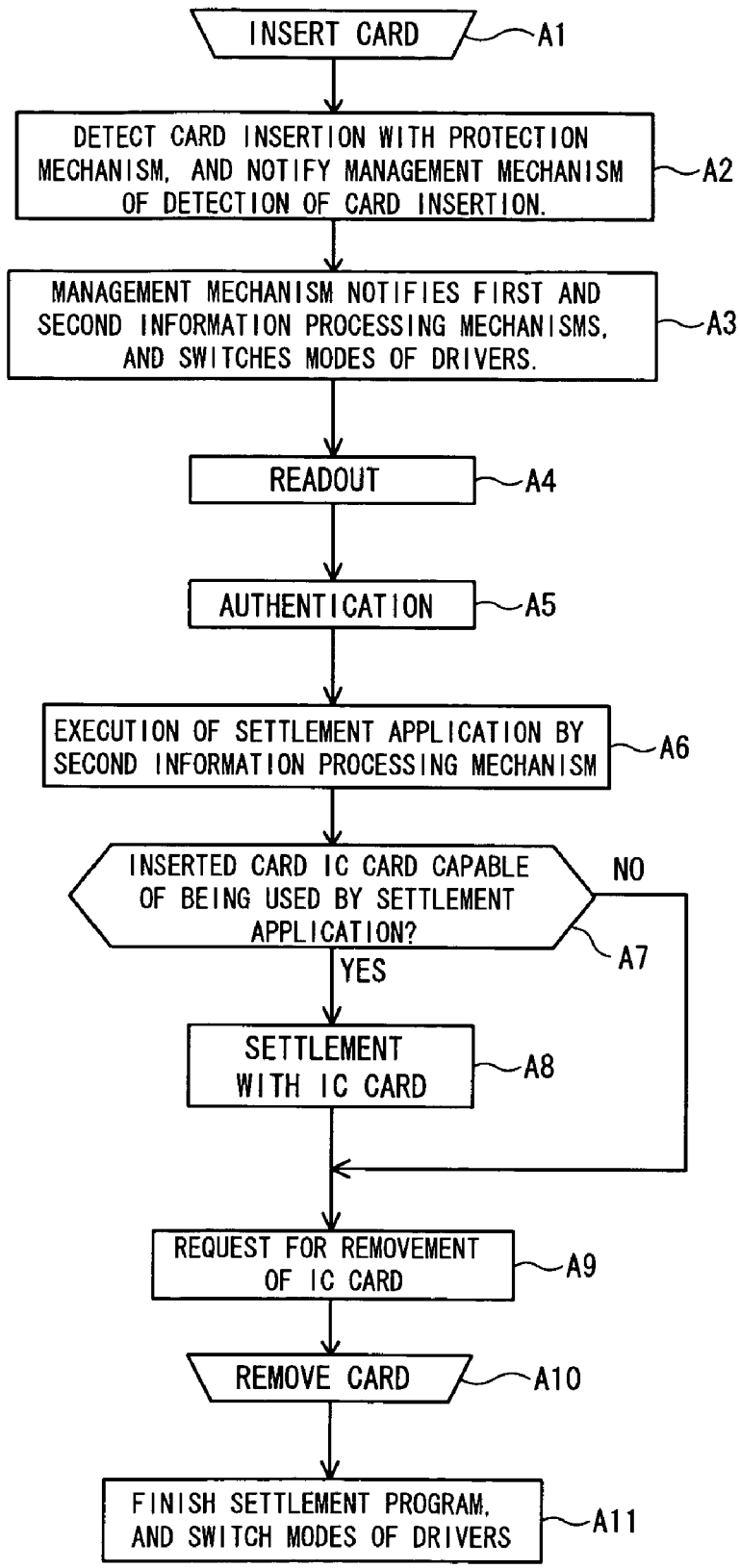
FIG. 5 is a flow chart for explaining the operation of this embodiment.

In the information processing terminal 1 according to an embodiment of the present invention, constituted as described above, the management mechanism 23 and the aforementioned protection mechanism 10 cooperate with each other to ensure the security of information in the settlement application 2b as shown in the flow chart of FIG. 5.

At first, during the operation of the ordinary POS application 2a, the computer 2 operates as the first information processing mechanism 21. At this time, the drivers 2d to 2f are operating in the ordinary operation modes to link with the POS application 2a via the OS kernel 2c. Key entry information entered from the keyboard 12 is processed by the POS application 2a through the protection driver 11d, serial driver 2g, keyboard driver 2f, and OS kernel 2c.

When settlement processing by the settlement application 2b is performed following execution of the POS application 2a described above, the settlement application 2b is triggered and started by that an IC card for settlement has been inserted into the card insertion slot, not shown in the figures, of the card reader/writer 13 of the protection mechanism 10.

At that time, when the IC card is inserted into the card insertion slot, and the card reader/writer 13 detects that the IC card has been connected with the information processing terminal 1 (step A1), the card insertion/removal management unit 11a of the cipher processing circuit 11 generates an interrupt which cannot be masked to output that to the OS kernel 2c constituting the management mechanism 23 [step A2, trigger detection step, see (1) in FIG. 2]. Thus, the card reader/writer 13 and card insertion/removal management unit 11a described above constitute a trigger detecting unit to start the second information processing mechanism 22.

The execution management unit 23a (OS kernel 2c) of the management mechanism 23 operates the first and second information processing mechanisms 21 and 22, when recognizing IC card insertion detected by the card reader/writer 13 and card insertion/removal management unit 11a, so as to restrict execution of the POS application and start the settlement application, thereby ensuring the security of information in processing of the settlement application 2b.

In this operation, the execution management unit 23a (OS kernel 2c) switches over the operation modes of the drivers 2d to 2f from the ordinary operation modes to the protective operation modes such that only the settlement application is able to directly link to the drivers 2d to 2f [step A3, see (2) in FIG. 2].

In other words, the execution management unit 23a constitutes an operation mode switching unit for switching the operation mode, when recognizing IC card insertion which is a trigger operation detected by the card reader/writer 13 and card insertion/removal management unit 1a, from an operation mode of linking the drivers 2d to 2f, which are input/output interfaces, to the first information mechanism 21 through the management mechanism 23, to an operation mode of linking the drivers 2d to 2f directly to the second information processing mechanism 22.

The card insertion/removal management unit 11a sets the operation mode of the protection driver 11d of the cipher processing circuit 11, when detecting card insertion as described above, at a mode in which an input for the settlement application entered from the keyboard 12 is output to the second information processing mechanism 22 in such a manner as to be able to be identified by the second information processing mechanism 22.

That is, after the card insertion/removal management unit 11a detects insertion of an IC card, the protection driver 11d outputs the entered information to the second information processing mechanism 22 by means of a key code which can be identified only by the second information processing mechanism 22 until the IC card is removed. In other words, in the second information processing mechanism 22, key entry information can be received only by the settlement application 2b through the keyboard driver 2f operating in the protective operation mode, and is unable to be received by the OS kernel 2c [see (3) in FIG. 2].

In settlement processing, an identification number, etc. having high confidentiality are usually entered from the keyboard 12 after insertion of an IC card, so that the entered information can be processed only by the settlement application capable of handling the identification number, etc. properly before the IC card is removed.

When an IC card is inserted and the drivers 2d to 2f are switched over to the protective operation modes as described above, information entered through the keyboard 12 or the touch panel 7, and information displayed through the display 6, etc. are prevented from leaking to anything other than the settlement application by the action of the drivers 2d to 2f and protection driver 11d before the IC card is removed.

Figure 6:
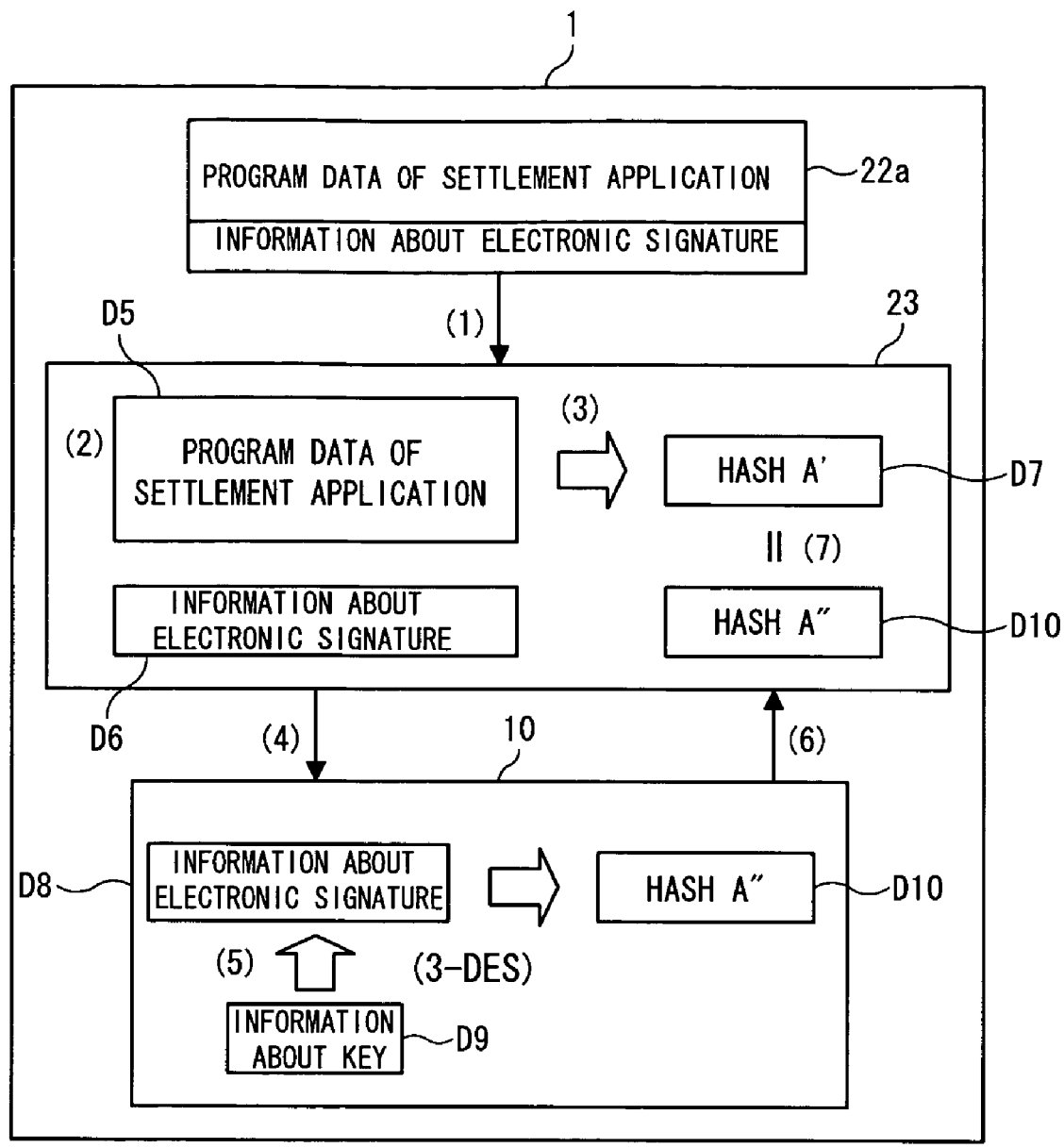
FIG. 6 is an explanatory view for explaining an authentication procedure using electronic signature information in this embodiment.

The readout unit 23b of the management mechanism 23 reads out, as shown by (1) in FIG. 6, program data and electronic signature information for the settlement application 2b from the settlement application use storage unit 22a (step A4, readout step).

When the readout unit 23b receives the program data and electronic signature information, the management mechanism 23 and the protection mechanism 10 cooperate with each other to authenticate the program data read out by the readout unit 23b using the electronic signature information read out together with the program data (step A5, authentication step).

Figure 4:
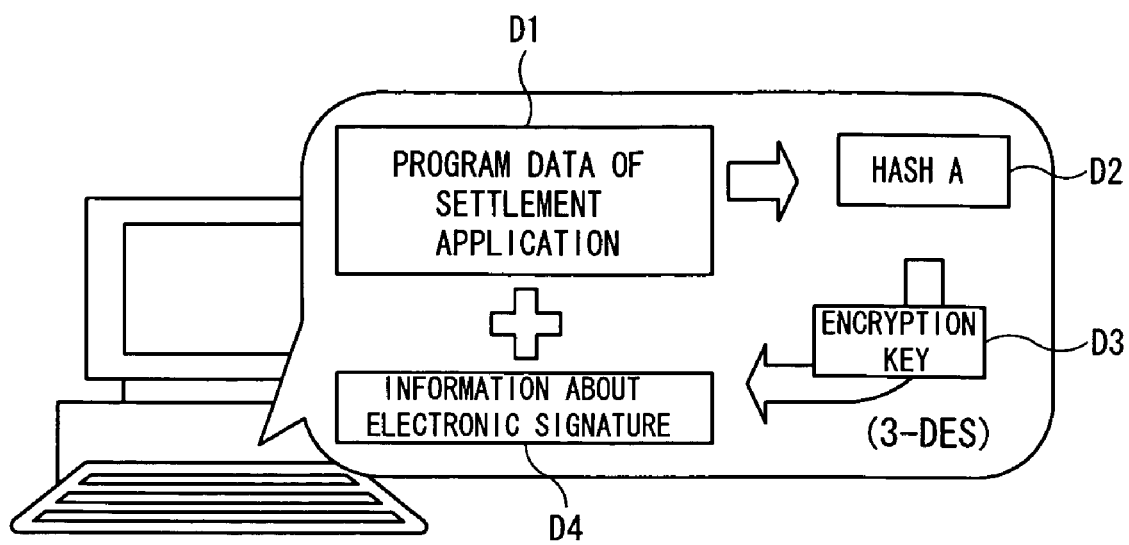
FIG. 4 is an explanatory view for explaining creation of electronic signature information in this embodiment.

Specifically, as shown as (2) in FIG. 6, the separation unit 23c of the management mechanism 23 separates the electronic signature information and program data read out by the readout unit 23b, and as shown as (3) in FIG. 6, the second collation information creating unit 23d creates hash A1' (D7) which is second collation information, using algorithm similar to that in case of FIG. 4 described above, from the program data (D5) separated by the separation unit 23c (second collation information creating step).

In addition, the separation unit 23c outputs the separated electronic signature information (D6) to the first collation information creating unit 11c of the protection mechanism 10 (identification information output step). The first collation information creating unit 11c creates hash A" (D10) which is first collation information, using the electronic signature information (D8) from the separation unit 23c, and the key information (D9) stored in the key information storage unit 11b, as shown as (5) in FIG. 6, by a technique similar to that in case of FIG. 4 described above (first collation information creating step), and outputs the obtained hash A" to the management mechanism 23 [see (6) in FIG. 6].

The key information (D9) stored in the key information storage unit 11b is the same as the key information (D3) used when the electronic signature information (D4) shown in FIG. 4 described above was created. Consequently, if the hash A" obtained by the first collation information creating unit 11c of the protection mechanism 10 described above is identical to the hash A' obtained by the second collation information creating unit 23d of the management mechanism 23, it is determined that the program data read out by the readout unit 23b of the management mechanism 23 is valid.

That is, the determination unit 23e of the management mechanism 23 determines whether the program data read out by the readout unit 23b can be authenticated by comparing, as shown as (7) in FIG. 6, the hash A" (D10) obtained by the first collation information creating unit 11c with the hash A' (D7) obtained by the second collation information creating unit 23d. In this determination, when the hash A" is coincident with the hash A', it is determined that the program can be authenticated (authentication success), and when the hash A" is not coincident with the hash A', it is determined that the program cannot be authenticated (authentication failure) (determination step).

When the authentication success has occurred in the authentication step (step A5 in FIG. 5) as described above, the execution management unit 23a of the management mechanism 23 allows the second information processing mechanism 22 to execute the settlement application by using the program data to which the authentication success has occurred (step A6 in FIG. 5, execution step).

At this time, the settlement application executed by the second information processing mechanism 22 confirms that an IC card inserted in the card insertion slot can be used in the settlement application, and then the process goes to actual settlement processing using the IC card (from YES route of step A7 to step A8).

When the actual settlement processing using the IC card is finished, the second information processing mechanism 22 requests removal of the IC card through a display facility such as a display 6 (step A9). If an IC card, which cannot be used by the settlement application, has been inserted, the actual settlement processing is not performed, and removal of the IC card is requested through a display facility such as a display 6 (from NO route of step A7 to step A9).

After that, the operation of removing the IC card inserted in the card insertion slot is performed, and thereby settlement application processing by the second information processing mechanism 22 is finished, and the drivers 2d to 2f are switched over to the ordinary operation modes together with the protection driver 11d so that the first information processing mechanism 21 comes to be able to execute the POS application.

That is, when the card insertion/removal management unit 11a detects removal of the IC card, the operation mode of the protection driver 11d is switched over from the protective operation mode to the ordinary operation mode. In addition, when the execution management unit 23a (OS kernel 2c) recognizes the removal of the IC card through the card insertion/removal management unit 11a and the serial driver 2g, it switches over the operation modes of the drivers 2d to 2f from the protective operation modes to the ordinary operation modes, and executes the POS application 2a [see (4) in FIG. 2].

Such being the case, in the information processing terminal 1 according to an embodiment of the present invention, the protection mechanism 10 and the execution management unit 23a allow the operation itself of the second information processing mechanism 22 to be performed under the control of a general-purpose OS, while preventing, for preservation of confidentiality, any input/output of necessary information from causing the leakage of information to other applications, whereby there is achieved an advantage that any leakage of identification information can be prevented while adopting a general-purpose OS to provide a free application software development environment and using a common keyboard for entry of identification number information and entry of other information.

[B] Others

It will be appreciated that, although specific embodiments have been described above by way of illustration, various modifications may be made without departing from the spirit and scope of the invention.

The information processing terminal 1 according to the above embodiment is so constituted that a second application requiring the security and protection of information and the preservation of confidentiality is assumed to be a settlement application, and a general-purpose first application is assumed to be a POS application, however, the present invention is not limited to this, and combinations of applications other than this are also of course possible.

Furthermore, the devices of the present invention may be manufactured according to the above embodiment.

What is claimed is:

1. An information processing terminal comprising:
    a first information processing mechanism capable of executing a general-purpose first application;
    a second information processing mechanism capable of executing a second application requiring security authentication of information;
    a management mechanism managing processes in said first and second information processing mechanisms;
    a protection mechanism securing and protecting information in execution of said second application, which is constituted independently of said first and second information processing mechanisms and said management mechanism, and contains a trigger detecting unit which detects a trigger operation to start said second information processing mechanism and outputs the detection of the trigger operation to said management mechanism; and
    drivers configured as input/output interfaces, the drivers being configured to perform input and output of data by said first application and said second application and configured to switch between an ordinary mode and a protective operation mode,
    wherein said management mechanism further comprises an execution management unit for effecting an operation of said first and second information processing mechanisms, when said trigger detecting unit detects said trigger operation, in such a way as to restrict execution of said first application and start said second application, only said second application is able to link with said drivers when said drivers are in the protective operation mode, and
    said management mechanism is configured to switch said drivers into the protective operation mode.

2. An information processing terminal according to claim 1, wherein said trigger detecting unit further comprises a connection detecting unit for detecting, as a trigger operation from the outside, that an external storage medium capable of storing data has been connected.

3. An information processing terminal according to claim 1, wherein said information processing terminal further comprises an input/output interface for performing, in processing in said first and second applications, interface processing between an input/output device for performing input/output of data and said first and second information processing mechanisms,
    wherein said execution management unit comprises an operation mode switching unit for switching the operation mode from an operation mode of linking said input/output interface to said first information processing mechanism through said management mechanism to an operation mode of linking said input/output interface directly to said second information processing mechanism, when detecting said trigger operation.

4. An information processing terminal according to claim 1, wherein:
    said second information processing mechanism comprises a second application-oriented storage unit for storing program data for said second application and identification information created from said program data;
    said protection mechanism comprises
    a key information storage unit for storing key information, and
    a first collation information creating unit to which identification information stored in said second application-oriented storage unit is inputted from said management mechanism, and which is able to create first collation information by using said inputted identification information, and key information stored in said key information storage unit;
    said management mechanism comprises a readout unit for reading out, when said trigger detecting unit detects said trigger operation, said program data and said identification information, from said second application-oriented storage unit,
    a separation unit for performing separation between said program data and identification information read out by said readout unit,
    a second collation information creating unit capable of creating second collation information from said program data separated by said separation unit, and
    a determination unit for determining whether program data for said second application can be authenticated or not by comparing first and second collation information created by said first and second collation information creating units respectively; and
    said execution management unit of said management mechanism is constituted in such a way as to allow said second information processing mechanism to execute said second application after it is determined by said determination unit that said program data can be authenticated.

5. An information processing terminal according to claim 4, wherein said protection mechanism further comprises an unauthorized access detecting unit for detecting unauthorized access to said protection mechanism, and a key information erasing unit for erasing key information stored in said key information storage unit when said unauthorized access is detected by said unauthorized access detecting unit.

6. An information processing terminal according to claim 1, wherein said protection mechanism further comprises a key entry unit and a protection driver for outputting, when said trigger detecting unit detects said trigger operation, an input entered by said key entry unit for said second application, to said second information processing mechanism in such a manner that it can be identified only by said second information processing mechanism.

7. An information processing terminal according to claim 2, wherein said protection mechanism further comprises a key entry unit and a protection driver for outputting, when said trigger detecting unit detects said trigger operation, an input entered by said key entry unit for said second application, to said second information processing mechanism in such a manner that it can be identified only by said second information processing mechanism.

8. An information processing terminal according to claim 3, wherein said protection mechanism further comprises a key entry unit and a protection driver for outputting, when said trigger detecting unit detects said trigger operation, an input entered by said key entry unit for said second application, to said second information processing mechanism in such a manner that it can be identified only by said second information processing mechanism.

9. An information processing terminal according to claim 4, wherein said protection mechanism further comprises a key entry unit and a protection driver for outputting, when said trigger detecting unit detects said trigger operation, an input entered by said key entry unit for said second application, to said second information processing mechanism in such a manner that it can be identified only by said second information processing mechanism.

10. An information processing terminal according to claim 5, wherein said protection mechanism further comprises a key entry unit and a protection driver for outputting, when said trigger detecting unit detects said trigger operation, an input entered by said key entry unit for said second application, to said second information processing mechanism in such a manner that it can be identified only by said second information processing mechanism.

11. An information processing terminal according to claim 1, wherein the information processing terminal is configured in such a manner as to execute processing of registration pertaining to a merchandise to be purchased as said first application, as well as processing of settlement of account about said registered merchandise to be purchased as said second application.

12. An information processing terminal according to claim 2, wherein the information processing terminal is configured in such a manner as to execute processing of registration pertaining to a merchandise to be purchased as said first application, as well as processing of settlement of account about said registered merchandise to be purchased as said second application.

13. An information processing terminal according to claim 3, wherein the information processing terminal is configured in such a manner as to execute processing of registration pertaining to a merchandise to be purchased as said first application, as well as processing of settlement of account about said registered merchandise to be purchased as said second application.

14. An information processing terminal according to claim 4, wherein the information processing terminal is configured in such a manner as to execute processing of registration pertaining to a merchandise to be purchased as said first application, as well as processing of settlement of account about said registered merchandise to be purchased as said second application.

15. An information processing terminal according to claim 5, wherein the information processing terminal is configured in such a manner as to execute processing of registration pertaining to a merchandise to be purchased as said first application, as well as processing of settlement of account about said registered merchandise to be purchased as said second application.

16. An information processing terminal according to claim 1, wherein said first and second information processing mechanisms and management mechanism are constituted by a shared computer, wherein said protection mechanism is built in a single housing together with said shared computer.

17. An information security and protection method of an information processing terminal, said information processing terminal comprising a first information processing mechanism capable of executing a general-purpose first application, a second information processing mechanism which is started by a trigger operation from the outside and is able to execute a second application while securing and protecting information, a management mechanism for managing processes in said first and second information processing mechanisms, and a protection mechanism for securing and protecting information in said second application, which is constituted independently of said first and second information processing mechanisms and said management mechanism, and drivers configured as input/output interfaces, the drivers being configured to perform input and output of data by said first application and said second application and configured to switch between an ordinary mode and a protective operation mode, wherein the information security and protection method of the information processing terminal comprises: notifying, in said protection mechanism, when detecting said trigger operation from the outside, said management mechanism of the detection of said trigger operation; reading out, when receiving notice of the detection of said trigger operation, program data for said second application and identification information created from said program data from the second information processing mechanism; authenticating, in said management mechanism and protection mechanism, in cooperation with each other, the program data read out in said readout by using the identification information read out together with said program data; and allowing an execution in said management mechanism, by using the program data authenticated in said authenticating, said second information processing mechanism to execute said second application, wherein only said second application is able to link with said drivers when said drivers are in the protective operation mode; and said management mechanism is configured to switch said drivers into the protective operation mode and switches an operation mode of said drivers before said reading out.

18. An information security and protection method of an information processing terminal according to claim 17, wherein said step of authenticating comprises:
creating second collation information, in said management mechanism, from said program data read out in said step of reading out,
outputting, in said management mechanism, identification information read out in said step of reading out to said protection mechanism;
creating first collation information, in said protection mechanism, by using the identification information outputted in said outputting and key information stored in said protection mechanism; and
determining, in said management mechanism, on occurrence of authentication success if said first collation information matches said second collation information, while on occurrence of authentication failure, if said first collation information does not match said second collations information, with comparing said first and second collation information created in steps of creating first and second collation information, respectively.

* * * * *

UNITED STATES PATENT AND TRADEMARK OFFICE
CERTIFICATE OF CORRECTION

PATENT NO. : 7,519,993 B2 Page 1 of 1
APPLICATION NO. : 10/893901
DATED : April 14, 2009
INVENTOR(S) : Susumu Hasegawa et al.

It is certified that error appears in the above-identified patent and that said Letters Patent is hereby corrected as shown below:

Column 12, Line 38, change "information, from" to --information from--.

Signed and Sealed this

Thirtieth Day of June, 2009

JOHN DOLL
*Acting Director of the United States Patent and Trademark Office*